United States Patent
Hwang et al.

(10) Patent No.: US 11,491,662 B2
(45) Date of Patent: Nov. 8, 2022

(54) FLEXIBLE ROBOT DOOR HINGE INSTALLATION SYSTEM

(71) Applicant: GM Global Technology Operations LLC, Detroit, MI (US)

(72) Inventors: Dooil Hwang, Rochester Hills, MI (US); Frederick G. Landry, Jr., Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/168,697

(22) Filed: Feb. 5, 2021

(65) Prior Publication Data
US 2022/0250251 A1 Aug. 11, 2022

(51) Int. Cl.
| | |
|---|---|
| *B25J 11/00* | (2006.01) |
| *B25J 9/12* | (2006.01) |
| *B23P 19/10* | (2006.01) |
| *B62D 65/06* | (2006.01) |
| *B25J 9/16* | (2006.01) |
| *B25J 15/00* | (2006.01) |
| *B25J 9/00* | (2006.01) |

(52) U.S. Cl.
CPC ............ *B25J 11/005* (2013.01); *B23P 19/10* (2013.01); *B25J 9/123* (2013.01); *B62D 65/06* (2013.01); *B23P 2700/50* (2013.01); *B25J 9/0084* (2013.01); *B25J 9/1687* (2013.01); *B25J 15/0052* (2013.01); *Y10T 29/24* (2015.01); *Y10T 29/4978* (2015.01); *Y10T 29/49766* (2015.01); *Y10T 29/49771* (2015.01)

(58) Field of Classification Search
CPC .. B25J 15/0052; B25J 9/16887; B25J 9/0084; B25J 9/123; B25J 11/005; Y10T 29/24; Y10T 29/49766; Y10T 29/49771; Y10T 29/4978; B23P 19/10; B23P 2700/50; B62D 65/06
See application file for complete search history.

(56) References Cited

U.S. PATENT DOCUMENTS

| | | | |
|---|---|---|---|
| 6,311,382 B1 * | 11/2001 | Jack ...................... | B62D 65/06 33/783 |
| 9,387,559 B2 * | 7/2016 | Jin ......................... | B23P 19/10 |
| 2005/0055824 A1 * | 3/2005 | Jung ....................... | B62D 65/06 29/714 |
| 2010/0163948 A1 * | 7/2010 | Bosshart ............. | H01L 27/0207 257/E21.24 |
| 2015/0158371 A1 * | 6/2015 | Jin ......................... | E05D 11/00 29/709 |
| 2015/0183474 A1 * | 7/2015 | Jin ......................... | B62D 65/06 414/800 |

* cited by examiner

*Primary Examiner* — Jermie E Cozart
(74) *Attorney, Agent, or Firm* — Vivacqua Crane PLLC

(57) ABSTRACT

An automobile vehicle flexible robot door hinge installation system includes a hinge servo-linear positioning device. The hinge servo-linear positioning device includes at least one servo-motor and at least one hinge effector releasably holding and positioning a vehicle door hinge. A fastener servo-linear installation device is also provided.

18 Claims, 6 Drawing Sheets

FLEXIBLE ROBOT DOOR HINGE INSTALLATION SYSTEM

INTRODUCTION

The present disclosure relates to systems and methods for installing and aligning a door hinge in automobile vehicles.

Automobile vehicle door installation during vehicle assembly is currently performed using a dedicated fixture individually adapted to a single vehicle model which holds a door hinges for installation on a vehicle frame as the vehicle is moved along an assembly line. The fixture is moved into an alignment position with the vehicle frame to position hinge bolt holes of an upper hinge and a lower hinge with vehicle frame threaded apertures. The upper hinge and the lower hinge are then fastened to the vehicle frame and the fasteners are torqued to predetermined torque values. The door is then installed on the door hinge. A hinge position of the body frame is adjusted to improve a door fit quality by measuring a gap and a flush fit between the door and the body frame. If the door alignment is outside of a predetermined measurement range, the automobile vehicle is moved to a repair station and the door hinge position is adjusted to enhance the door fit quality. If there is a trending problem with the overall door fit quality a mechanical shim may be installed to adjust a position of the door hinge in the hinge setting fixture. The work of adjusting the position of the hinge that is aligned with the vehicle frame in the hinge setting fixture is possible only when production is stopped and requires substantial labor and time.

Thus, while current automobile vehicle door alignment fixtures and shim processes to align vehicle doors during vehicle assembly achieve their intended purpose, there is a need for a new and improved system and method for installing automobile vehicle door hinges and fasteners.

SUMMARY

According to several aspects, an automobile vehicle flexible robot door hinge installation system includes a hinge servo-linear positioning device. The hinge servo-linear positioning device includes at least one servo-motor and at least one hinge effector releasably holding and positioning a vehicle door hinge. A fastener servo-linear installation device is also provided.

In another aspect of the present disclosure, the at least one hinge effector includes a first hinge effector releasably holding a first hinge and a second hinge effector releasably holding a second hinge.

In another aspect of the present disclosure, the at least one servo-motor defines a first servo-motor and a second servo-motor.

In another aspect of the present disclosure, the first servo-motor directs motion of the first hinge effector within a first range of opposed vertical offset dimensions and the second servo-motor directs motion of the second hinge effector in a second range of opposed vertical offset dimensions.

In another aspect of the present disclosure, the first hinge effector and the second hinge effector are independently displaced to achieve a predetermined hinge spacing dimension between the hinge and the second hinge.

In another aspect of the present disclosure, the first hinge and the second hinge are positioned using a virtual door line saved in a memory of an operating system, and wherein predetermined positions of a first fastener aperture and a second fastener aperture of the first hinge and of a third fastener aperture and a fourth fastener of the second hinge together with a hinge spacing dimension position the first hinge and the second hinge within nominal hinge location positions of a vehicle door frame.

In another aspect of the present disclosure, the first hinge effector and the second hinge effector individually include a first hinge clamp and a second hinge clamp actuated to hold one of the first hinge or the second hinge during installation and until fasteners are installed to fix the first hinge or the second hinge.

In another aspect of the present disclosure, a robot mounting plate rotationally connects the hinge servo-linear positioning device to a first robot, and an angular orientation of the hinge servo-linear positioning device is selected by rotation of the robot mounting plate within a range of rotation.

In another aspect of the present disclosure, the fastener servo-linear installation device includes a third servo-motor and a fourth servo-motor, the third servo-motor directing motion of a first fastener effector in opposed vertical directions, the fourth servo-motor directing motion of a second fastener effector in opposed vertical directions.

In another aspect of the present disclosure, a fastener runner connected to the first fastener effector and the second fastener effector to install, axially rotate and apply a predetermined torque to a fastener.

According to several aspects, an automobile vehicle flexible robot door hinge installation system includes a hinge servo-linear positioning device including: first and second servo-motors; a first hinge effector releasably holding and positioning a first vehicle door hinge connected to the first servo-motor; and a second hinge effector releasably holding and positioning a second vehicle door hinge connected to the second servo-motor. A fastener servo-linear installation device includes a third servo-motor and a fourth servo-motor. A first fastener effector with the third servo-motor directs motion of the first fastener effector in opposed vertical directions. A second fastener effector has the fourth servo-motor directing motion of the second fastener effector in opposed vertical directions.

In another aspect of the present disclosure, a lift assist device system providing a lift assist to the hinge servo-linear positioning device and the fastener servo-linear installation device.

In another aspect of the present disclosure, the lift assist device system includes a lift unit connected to an overhead crane member. A lift extender extends upward and downward from the lift unit and is attached to a structural member of one of the hinge servo-linear positioning device and the fastener servo-linear installation device.

In another aspect of the present disclosure, a first robot supports and positions the hinge servo-linear positioning device. A second robot supports and positions the fastener servo-linear installation device.

In another aspect of the present disclosure, a single robot supporting and positioning the hinge servo-linear positioning device and the fastener servo-linear installation device.

In another aspect of the present disclosure, a vision system providing visual confirmation of reference points on a vehicle door frame for installation positions of the first vehicle door hinge and the second vehicle door hinge.

In another aspect of the present disclosure, a hinge feeding system provides the first hinge and the second hinge to the hinge servo-linear positioning device. A bolt feeding system provides fasteners to the fastener servo-linear installation device.

According to several aspects, a method to operate an automobile vehicle hinge setting and installation system includes: reading a hinge target set value; introducing a body reference point to locate a hinge assembly; identifying if a manual forced hinge set position is required indicating the hinge assembly may be automatically installed within predetermined offset values; entering offset values for modified values for a first range of opposed vertical offset dimensions, a second range of opposed vertical offset dimensions and a range of rotation in real-time; comparing the offset values for the modified values to triggering threshold values; if the offset values for the modified values are GREATER than the triggering threshold values, the hinge assembly and a robot controlling a position of the hinge assembly are displaced by the offset values; and aligning the hinge assembly to a vehicle body.

In another aspect of the present disclosure, the method includes: installing hinge bolts and applying a predetermined torque to the hinge bolts; measuring an applied torque to the hinge bolts and comparing the applied torque to a target torque value; and ending the program if the measured applied torque is greater than the target torque value.

In another aspect of the present disclosure, the method includes: installing hinge bolts and applying a predetermined torque to the hinge bolts; measuring an applied torque to the hinge bolts and comparing the applied torque to a target torque value; reapplying the predetermined torque if the measured hinge bolt torque is NOT greater than the target torque value; remeasuring the applied torque to the hinge bolts and comparing the applied torque to a target torque value; and ending the program if the measured applied torque is greater than the target torque value.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
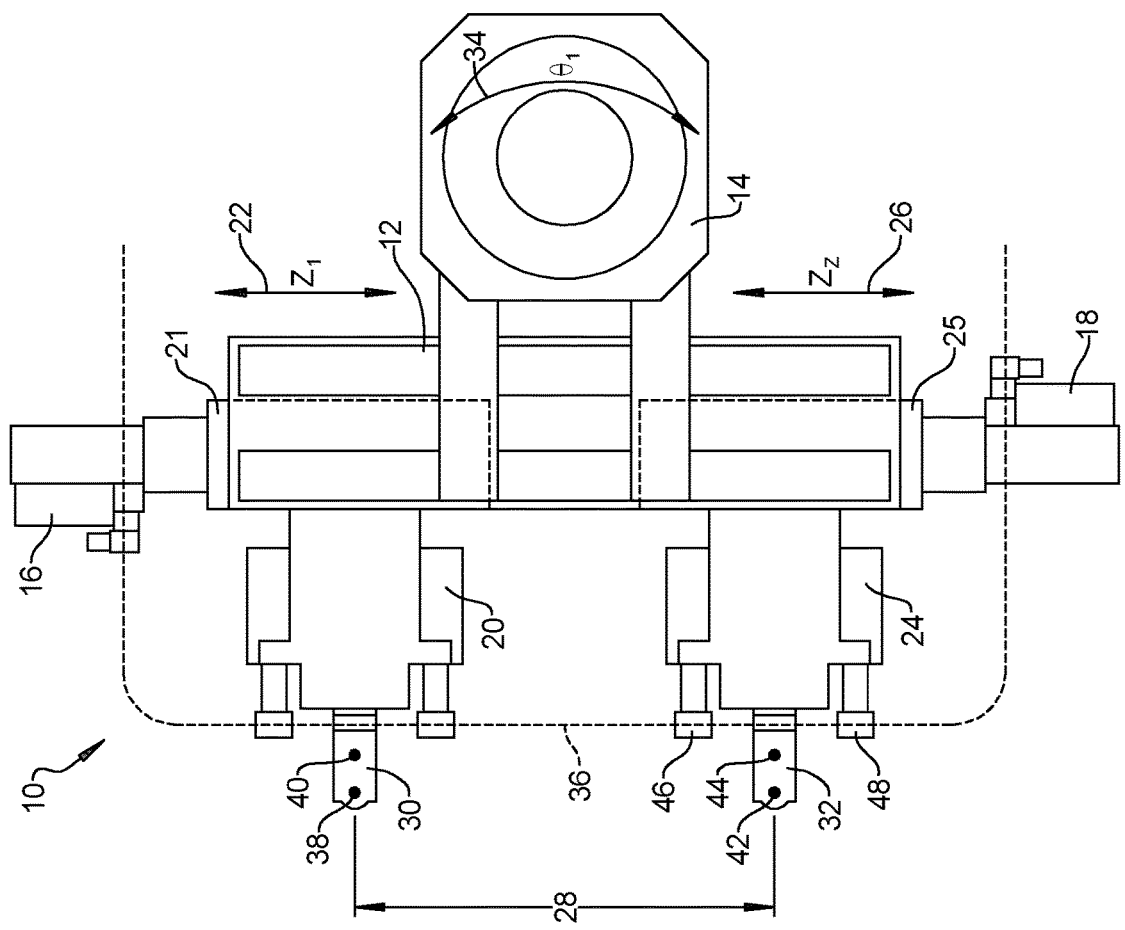
FIG. 1 is a front elevational view of a hinge servo-linear positioning device of a flexible robot door hinge installation system according to an exemplary aspect.
Figure 7:
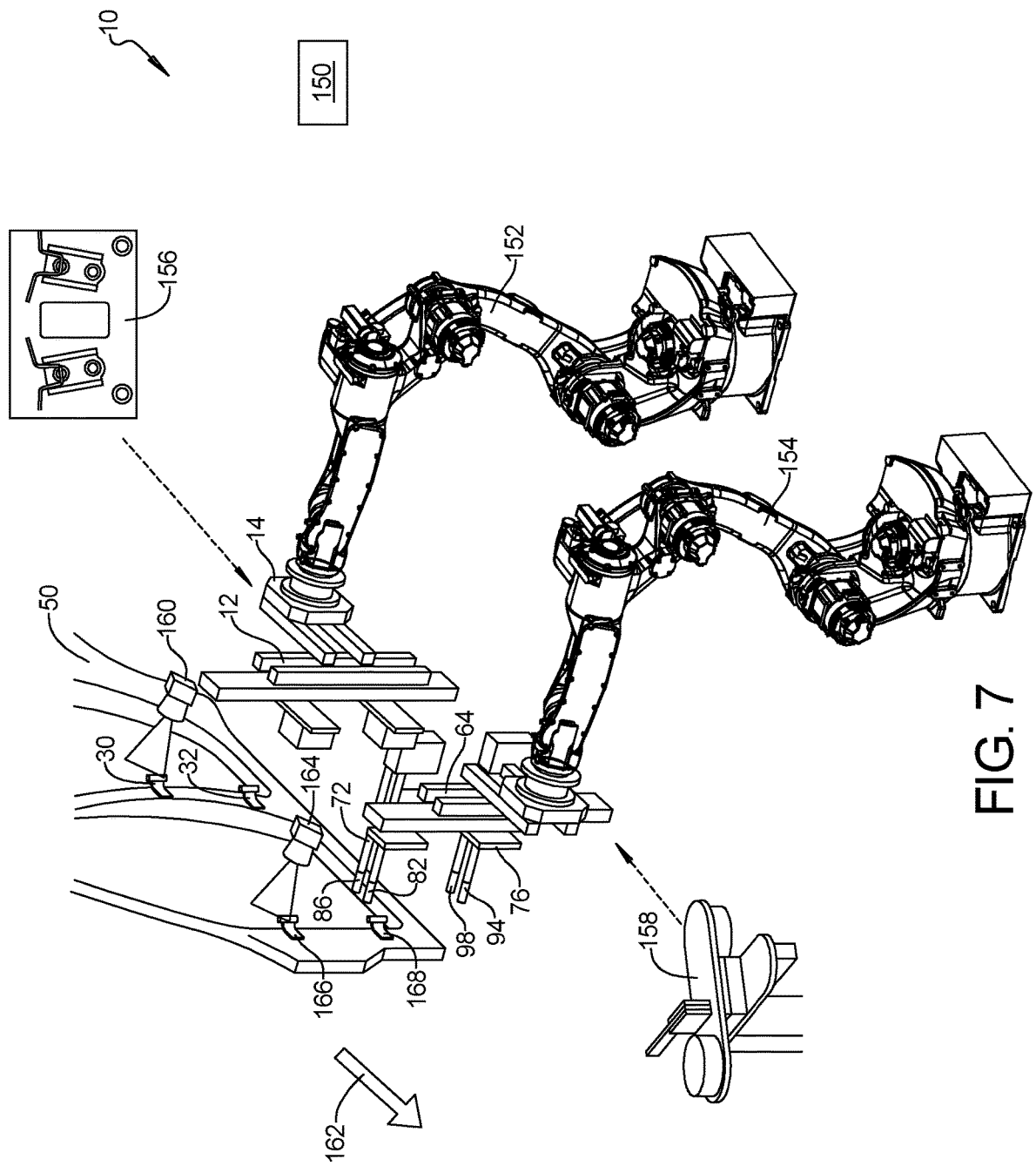
FIG. 7 is a front perspective view of a two-robot version of the flexible robot door hinge installation system of FIG. 1.

Referring to FIG. 1, an automobile vehicle flexible robot door hinge installation system 10 includes a hinge servo-linear positioning device 12 which is rotationally connected by a robot mounting plate 14 to a first robot shown and described in reference to FIG. 7. According to several aspects, the hinge servo-linear positioning device 12 includes a first servo-motor 16 and a second servo-motor 18. The first servo-motor 16 directs motion of a first or upper hinge effector 20 using a first linear positioner 21 within a first range of opposed vertical offset dimensions 22. The second servo-motor 18 directs motion of a second or lower hinge effector 24 using a second linear positioner 25 in a second range of opposed vertical offset dimensions 26. The upper hinge effector 20 and the lower hinge effector 24 are independently displaced to achieve a predetermined hinge spacing dimension 28 between an upper or first hinge 30 and a lower or second hinge 32. An angular orientation of the hinge servo-linear positioned device 12 may be selected by rotation of the robot mounting plate 14 within a range of rotation 34 defining an angle theta ($\theta$).

Figure 6:
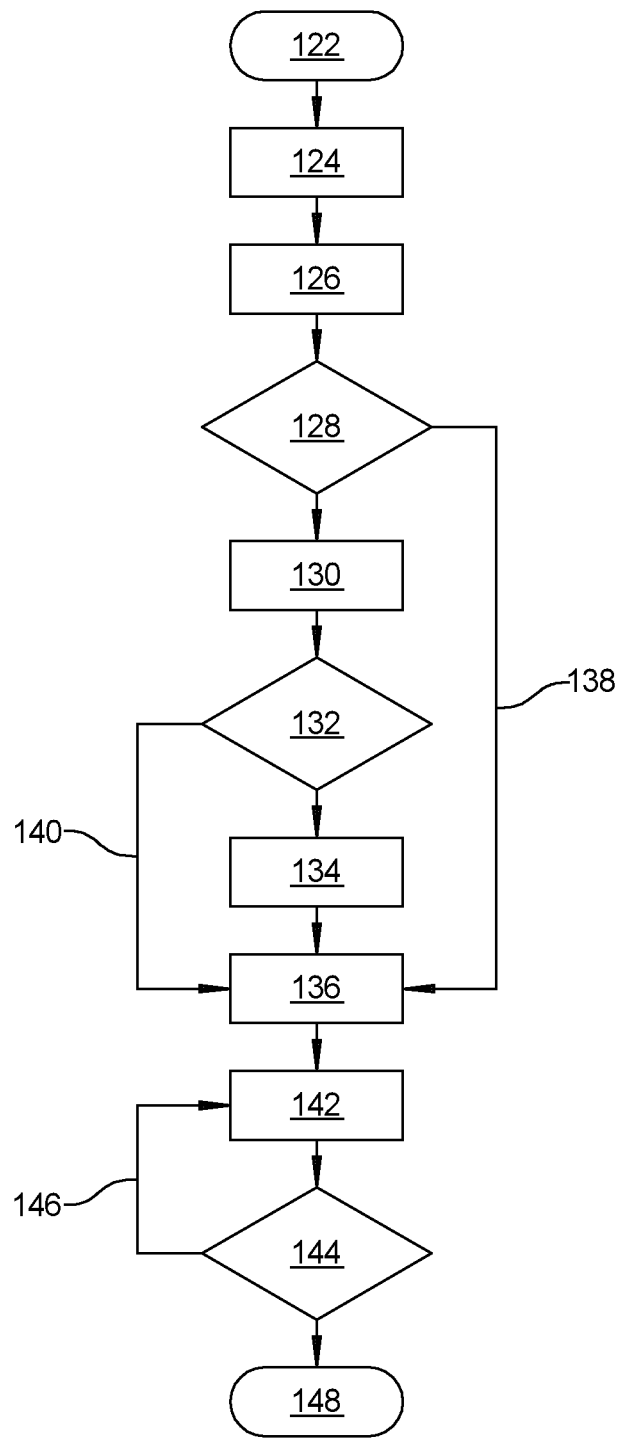
FIG. 6 is a flow diagram of the method steps for operation of the flexible robot door hinge installation system of FIG. 1.

The first hinge 30 and the second hinge 32 are positioned using a virtual door line 36 saved in a memory of an operating system described in reference to FIG. 6. Predetermined positions of a first fastener aperture 38 and a second fastener aperture 40 of the first hinge 30 and of a third fastener aperture 42 and a fourth fastener 44 of the second hinge 32 together with the hinge spacing dimension 28 are used to position the first hinge 30 and the second hinge 32 within a nominal location positions of a vehicle door frame shown and described in reference to FIG. 2. The upper hinge effector 20 and the lower hinge effector 24 individually include a first hinge clamp 46 and a second hinge clamp 48 actuated to hold one of the first hinge 30 or the second hinge 32 during installation, and until fasteners are installed to fix the first hinge 30 or the second hinge 32.

Referring to FIG. 2 and again to FIG. 1, the first hinge 30 and the second hinge 32 are shown in exemplary installed positions on a vehicle door frame 50. The upper hinge effector 20 positions the first hinge 30 with the first fastener aperture 38 coaxially aligned with a first threaded aperture 52 of the vehicle door frame 50, and with the second fastener aperture 40 coaxially aligned with a second threaded aperture 54 of the vehicle door frame 50. Similarly, the lower hinge effector 24 positions the second hinge 32 with the third fastener aperture 42 coaxially aligned with a third threaded aperture 56 of the vehicle door frame 50, and with the fourth fastener aperture 44 coaxially aligned with a fourth threaded aperture 58 of the vehicle door frame 50. The upper hinge effector 20 also visually aligns and positions the first hinge 30 within a predetermined first offset range 60 of the vehicle door frame 50, and the lower hinge effector 24 visually aligns and positions the second hinge 32 within a predetermined second offset range 62 of the vehicle door frame 50.

Figure 2:
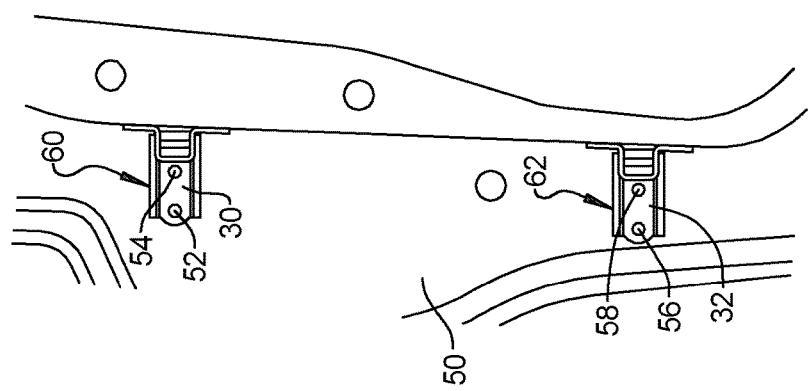
FIG. 2 is a side elevational view of a vehicle door frame having upper and lower door hinges in installed positions.

Referring to FIG. 3 and again to FIGS. 1 and 2, the flexible robot door hinge installation system 10 also includes a fastener linear positioner 64 which is connected by a robot mounting plate 66 to a second robot shown and described in reference to FIG. 7. According to several aspects, the fastener linear positioner 64 includes a third servo-motor 68 and a fourth servo-motor 70 respectively. The third servo-motor 68 directs motion of an upper or first fastener effector 72 in opposed vertical directions 74. The fourth servo-motor 70 directs motion of a lower or second fastener effector 76 in opposed vertical directions 78.

A first fastener runner 80 connected to the upper fastener effector 72 installs, axially rotates and applies a predetermined torque to a first fastener 82, for example for installation into the first fastener aperture 38 and the first threaded aperture 52. A second fastener runner 84 connected to the upper fastener effector 72 installs, axially rotates and applies a predetermined torque to a second fastener 86, for example for installation into the second fastener aperture 40 and the second threaded aperture 54. A fastener spacing 88 is fixed and predetermined to suit the hinge being installed. The upper fastener effector 72 is displaceable with respect to a first linear positioner 90 in the opposed vertical directions 74 by operation of the third servo-motor 68.

A third fastener runner 92 connected to the lower fastener effector 76 installs, axially rotates and applies a predetermined torque to a third fastener 94, for example for installation into the third fastener aperture 42 and the third threaded aperture 56. A fourth fastener runner 96 connected to the lower fastener effector 76 installs, axially rotates and applies a predetermined torque to a fourth fastener 98, for example for installation into the fourth fastener aperture 44 and the fourth threaded aperture 58. The fixed fastener spacing 88 identified above is also applicable to the third fastener runner 92 and the fourth fastener runner 96. The lower fastener effector 76 is displaceable with respect to a second linear positioner 100 in the opposed vertical directions 78 by operation of the fourth servo-motor 70.

Figure 3:
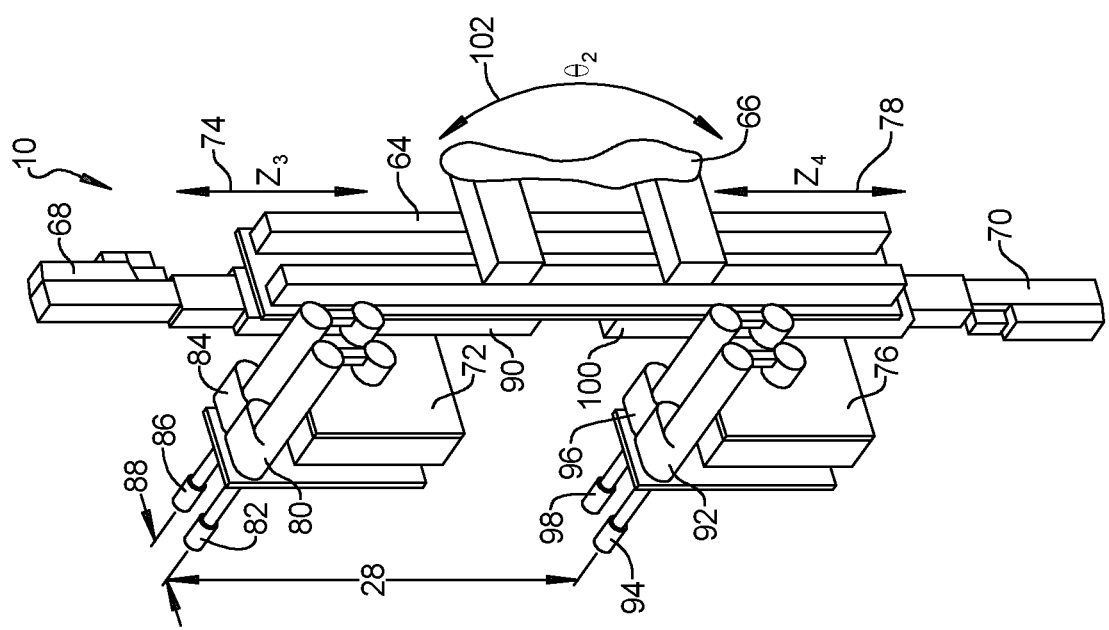
FIG. 3 is a front perspective view of a fastener servo-linear installation device of the flexible robot door hinge installation system of FIG. 1.

Referring to FIG. 4 and again to FIGS. 1 through 3, a portion of a door 104 is shown after installation onto the first hinge 30 and the second hinge 32. Additional location adjustment of the door 104 may be made at the time of installation of the door 104.

Figure 5:
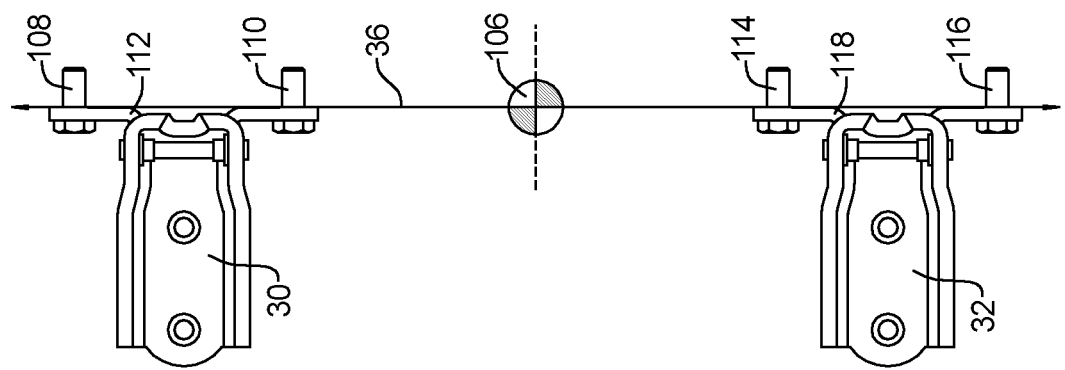
FIG. 5 is a side elevational view of a hinge installation tool center point during installation of the upper and lower hinges.
Figure 4:
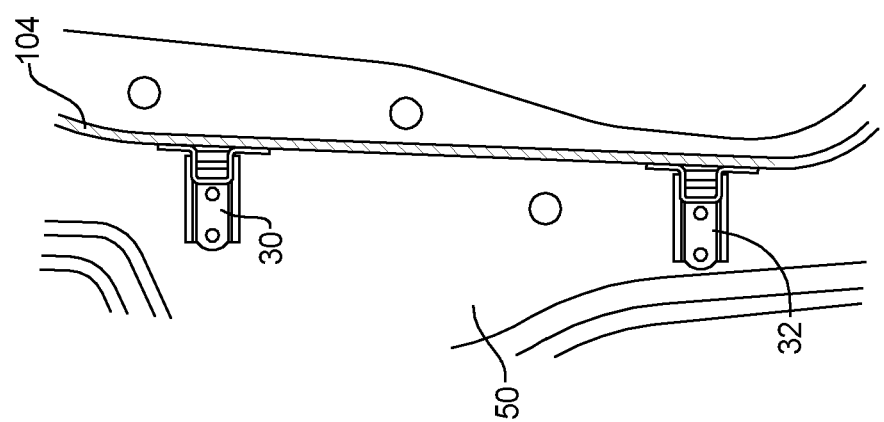
FIG. 4 is a side elevational view similar to FIG. 2 further showing a door portion.

Referring to FIG. 5 and again to FIGS. 1 through 4, a tool center point 106 is saved in a database of the operating system described in reference to FIG. 6. The door 104 shown and described in reference to FIG. 4 is positioned using the virtual door line 36 described in reference to FIG. 1 and saved in the memory of the operating system described in reference to FIG. 6 which extends through the tool center point 106. A first door fastener 108 and a second door fastener 110 are extended through a flange 112 of the first hinge 30, fastened to the door 104 and torqued. A third door fastener 114 and a fourth door fastener 116 are extended through a flange 118 of the second hinge 32, fastened to the door 104 and torqued.

Referring to FIG. 6 and again to FIGS. 1 through 5, a hinge setting and installation system 120 and method for operating the hinge setting and installation system 120 are initiated at a start step 122. A hinge target set value is read at a step 124. A body reference point which locates a hinge assembly is then introduced in a step 126. The program identifies if a manual forced hinge set position is required in a determination step 128. If the response to the determination step 18 is NO, indicating the hinge assembly may be automatically installed within predetermined offset values, the program moves to a receiving step 130 wherein offset values for modified or delta values for the first range of opposed vertical offset dimensions 22, the second range of opposed vertical offset dimensions 26 and the range of rotation 34 are entered in real-time. In a following comparison step 132, the offset values for the modified or delta values are compared to triggering threshold values. If during the comparison step 132 the offset values for the modified or delta values are found to GREATER than the triggering threshold values, the program transitions to a displacement step 134 wherein the hinge assembly and the robot controlling a position of the hinge assembly are displaced by the offset values. Following the displacement step 134, in an alignment step 136 the hinge assembly is aligned to the vehicle body such as to the vehicle door frame 50.

If the response to the determination step 128 is YES, indicating the hinge assembly may NOT be automatically installed within predetermined offset values, the program in a bypass step 138 moves directly to the alignment step 136. If during the comparison step 132 the offset values for the modified or delta values are found to be LESS than the triggering threshold values, the program in a second bypass step 140 moves directly to the alignment step 136. Following the alignment step 136 in a fastener installation step 142 hinge bolts are installed and a predetermined torque is applied. In a following torque measurement step 144 the torque applied to the hinge bolts is measured and compared to a target torque value. If the measured hinge bolt torque is NOT greater than the target torque value the program returns to the fastener installation step 142. If the measured hinge bolt torque is greater than the target torque value the program ends at an end step 148.

Referring to FIG. 7 and again to FIGS. 1 through 6, the flexible robot door hinge installation system 10 may include a controller and memory 150 providing operational control signals having values such as the hinge target set value, the body reference point, the predetermined offset values, the triggering threshold values, and the predetermined torque values. A first robot 152 communicates with the controller and memory 150 and is connected to and controls movement of the hinge servo-linear positioning device 12. A second robot 154 communicates with the controller and memory 150 and is connected to and controls movement of the fastener servo-linear installation device 64. The hinge servo-linear positioning device 12 receives hinge assemblies for installation from a hinge feeding system 156 in communication with the controller and memory 150. The fastener servo-linear installation device 64 receives fasteners for installation from a bolt feeding system 158 in communication with the controller and memory 150.

A first vision system 160 provides confirmation of reference points for example on the vehicle door frame 50 for installation of the hinge assemblies such as the first hinge 30, the second hinge 32, and the first fastener 82, second fastener 86 and the third fastener 94 and fourth fastener 98 as the automobile vehicle moves in an assembly line direction 162. A second vision system 164 similarly provides confirmation of reference points for example on the vehicle door frame 50 for installation of a third hinge assembly 166 and a fourth hinge assembly 168 and fastener bolts.

Referring to FIG. 8 and again to FIG. 7, according to several aspects a flexible robot door hinge installation system 170 is modified from the flexible robot door hinge installation system 10, with common items having the same part numbers. The flexible robot door hinge installation system 170 is operable as a single robot system having both a hinge installation portion and a fastening portion moved by a single robot connected to the robot mounting plate 14. A fifth servo-motor 172 operates a linear motion slide 174 for positioning the first hinge 30 in opposed horizontal directions 176. A sixth servo-motor 178 operates a linear motion slide 180 for positioning the second hinge 32 in opposed horizontal directions 182. A seventh servo-motor 184 directs motion of a first or upper fastener effector 186 in opposed vertical directions 188. An eighth servo-motor 190 directs motion of a second or lower fastener effector 192 in opposed vertical directions 194. The robot mounting plate 14 is connected to the single robot (not shown) and allows rotational motion of the flexible robot door hinge installation system 170 about an arc of rotation 196.

Figure 9:
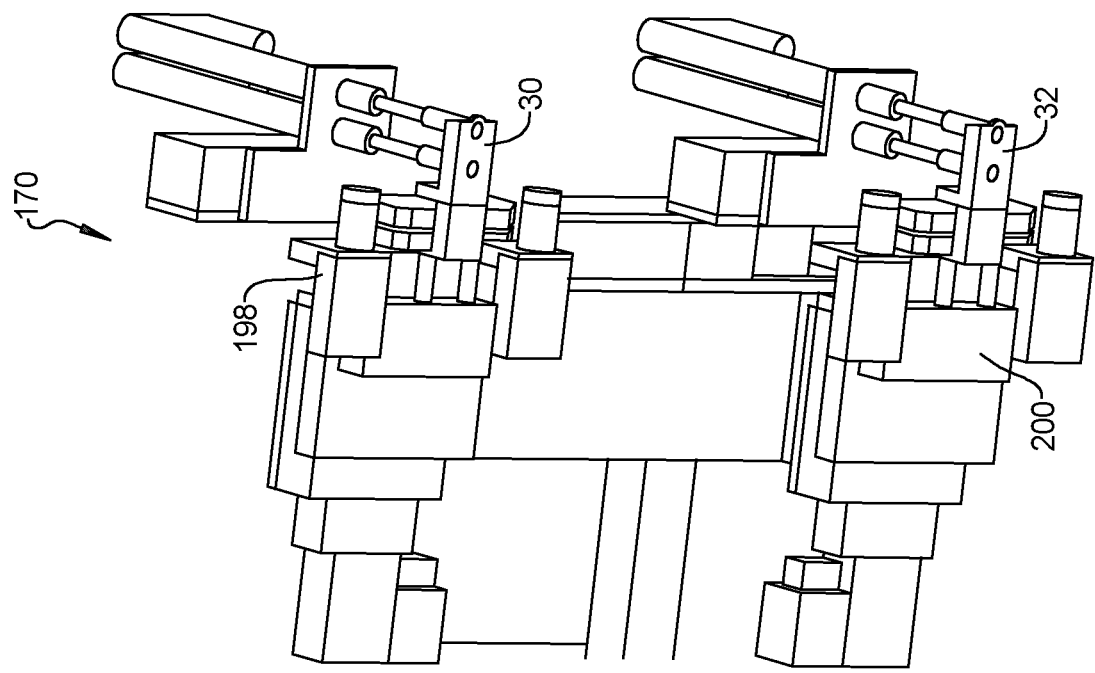
FIG. 9 is a rear perspective view of the one-robot version of FIG. 8.
Figure 8:
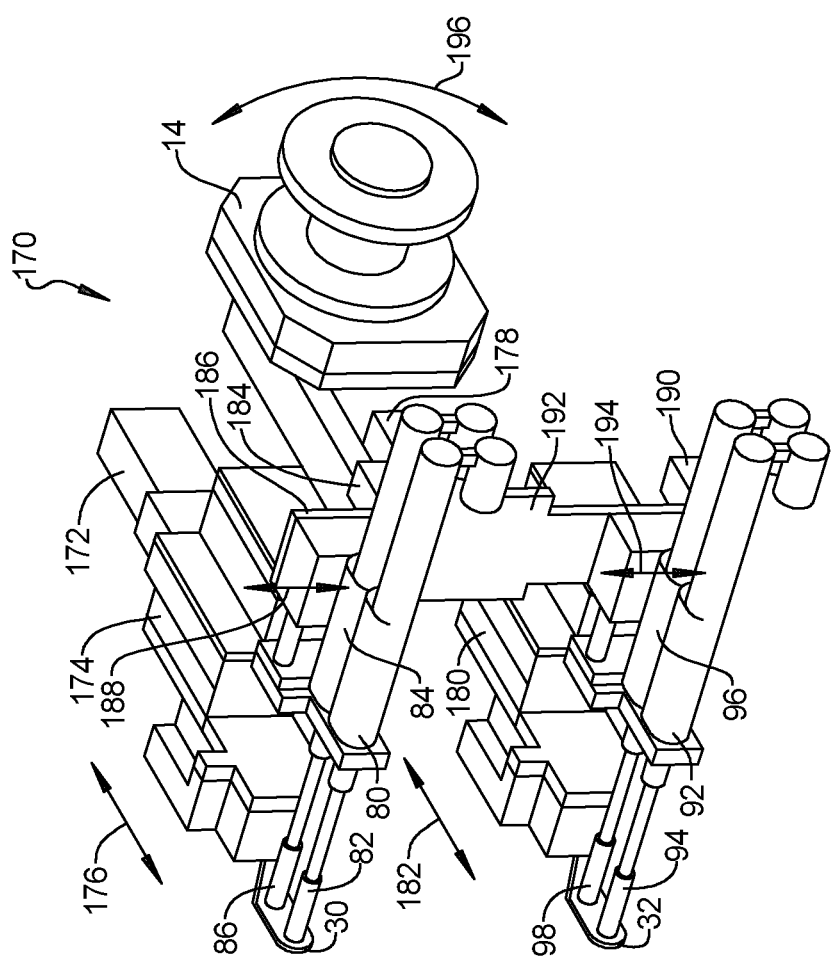
FIG. 8 is a front perspective view of a one-robot version of the flexible robot door hinge installation system of FIG. 1.

Referring to FIG. 9 and again to FIG. 8, the flexible robot door hinge installation system 170 further includes a rotary swing clamp 198 for rotation of the first hinge 30. A guide cylinder 200 is also provided for horizontal displacement of the hinges such as the second hinge 32.

Figure 10:
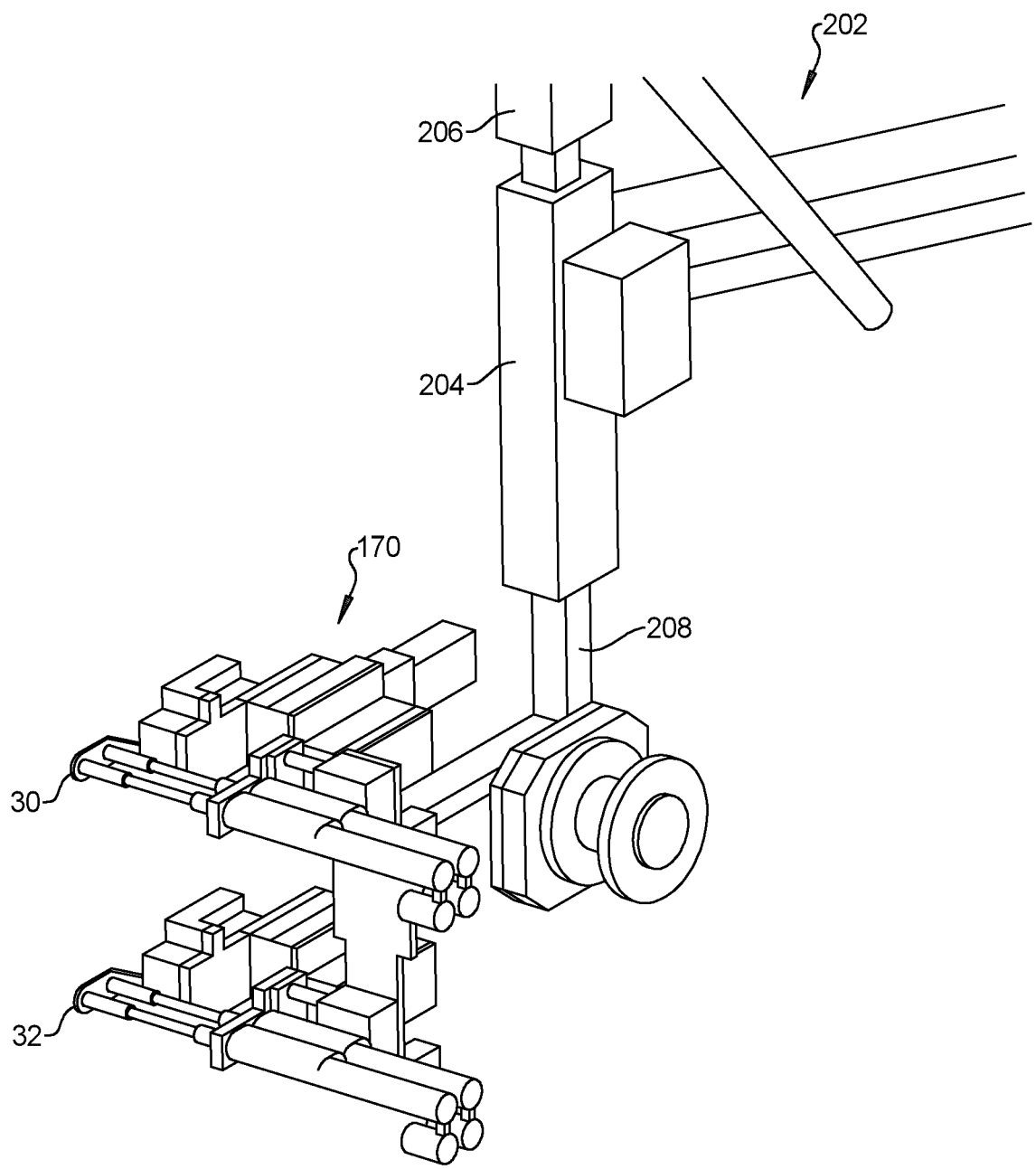
FIG. 10 is a front perspective view of the one-robot version of the flexible robot door hinge installation system of FIG. 9 supported by a vertical lift assist device.

Referring to FIG. 10 and again to FIGS. 1 through 9, a lift assist device system 202 may be used to provide a lift assist for any of the flexible door hinge installation systems of the present disclosure. As an example, the lift assist device system 202 is presented connected to the flexible robot door hinge installation system 170. The lift assist device system 202 provides lift support via inclusion of a lift unit 204 which is connected to an overhead crane member 206. A lift extender 208 extends upward and downward from the lift unit 204 and attached to structure of the flexible robot door hinge installation system 170.

A proper hinge setting position is controlled by one or more linear servo positioners and installation robots. A real-time hinge setting position can be adjusted. A hinge and bolt setting position can be adjusted according to a vehicle style and offset values fed by an outside measuring system such as a vision system into both the hinge and the bolt installation robots. A final check is conducted of bolt loosening torque to finish the installation process.

A flexible robot door hinge installation system of the present disclosure offers several advantages. These include a robot end effector that can handle and install multiple vehicle door hinges and hinge designs while properly adjusting the hinge setting position in real-time. The robot end effector of the present disclosure obviate many of the present one-style dedicated hinge setting fixtures now used, and enhances an integrity of a door hinge setting quality by providing a real-time door hinge setting and installation process.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automobile vehicle flexible robot door hinge installation system, comprising:
   a hinge servo-linear positioning device including:
      at least one servo-motor; and
      at least one hinge effector releasably holding and positioning at least one door hinge; and
   a fastener servo-linear installation device,
   wherein the at least one door hinge includes a first hinge and a second hinge, and wherein the at least one hinge effector includes a first hinge effector releasably holding the first hinge and a second hinge effector releasably holding the second hinge, and
   wherein the first hinge and the second hinge are positioned using a virtual door line saved in a memory of an operating system, and wherein predetermined positions of a first fastener aperture and a second fastener aperture of the first hinge and of a third fastener aperture and a fourth fastener aperture of the second hinge together with a hinge spacing dimension position the first hinge and the second hinge within nominal hinge location positions of a vehicle door frame.

2. The system of claim 1, wherein the at least one servo-motor defines a first servo-motor and a second servo-motor.

3. The system of claim 2, wherein the first servo-motor directs motion of the first hinge effector within a first range of opposed vertical offset dimensions and the second servo-motor directs motion of the second hinge effector in a second range of opposed vertical offset dimensions.

4. The system of claim 3, wherein the first hinge effector and the second hinge effector are independently displaced to achieve a predetermined hinge spacing dimension between the first hinge and the second hinge.

5. The system of claim 2, wherein the fastener servo-linear installation device includes a third servo-motor directing motion of a first fastener effector in opposed vertical directions and a fourth servo-motor directing motion of a second fastener effector in opposed vertical directions.

6. The system of claim 5, further including a fastener runner connected to the first fastener effector and the second fastener effector to install, axially rotate and apply a predetermined torque to a fastener.

7. The system of claim 1, wherein the first hinge effector and the second hinge effector individually include a first hinge clamp and a second hinge clamp actuated to hold one of the first hinge and the second hinge during installation and until fasteners are installed to fix the first hinge or the second hinge.

8. The system of claim 1, including a robot mounting plate rotationally connecting the hinge servo-linear positioning device to a first robot, an angular orientation of the hinge servo-linear positioning device selected by rotation of the robot mounting plate within a range of rotation.

9. An automobile vehicle flexible robot door hinge installation system, comprising:
   a hinge servo-linear positioning device including:
      a first servo-motor and a second servo-motor;
      a first hinge effector releasably holding and positioning a first vehicle door hinge connected to the first servo-motor; and
      a second hinge effector releasably holding and positioning a second vehicle door hinge connected to the second servo-motor;
   a fastener servo-linear installation device including:
      a third servo-motor and a fourth servo-motor;
      a first fastener effector with the third servo-motor directing motion of the first fastener effector in opposed vertical directions; and
      a second fastener effector with the fourth servo-motor directing motion of the second fastener effector in opposed vertical directions.

10. The system of claim 9, including a lift assist device providing lift assistance to the hinge servo-linear positioning device and the fastener servo-linear installation device.

11. The system of claim 10, wherein the lift assist device includes:
   a lift unit connected to an overhead crane member; and
   a lift extender extending upward and downward from the lift unit and attached to a structural member of one of the hinge servo-linear positioning device and the fastener servo-linear installation device.

12. The system of claim 9, including:
   a first robot supporting and positioning the hinge servo-linear positioning device; and
   a second robot supporting and positioning the fastener servo-linear installation device.

13. The system of claim 9, including a robot supporting and positioning the hinge servo-linear positioning device and the fastener servo-linear installation device.

14. The system of claim 9, including a vision system providing visual confirmation of reference points on a vehicle door frame for installation positions of the first vehicle door hinge and the second vehicle door hinge.

15. The system of claim 9, including:
a hinge feeding system providing the first hinge and the second hinge to the hinge servo-linear positioning device; and
a bolt feeding system providing fasteners to the fastener servo-linear installation device.

16. A method to operate an automobile vehicle hinge setting and installation system, comprising:
providing the automobile vehicle hinge setting and installation system, comprising:
a hinge servo-linear positioning device including:
a first servo-motor and a second servo-motor;
a first hinge effector releasably holding and positioning a first vehicle door hinge connected to the first servo-motor; and
a second hinge effector releasably holding and positioning a second vehicle door hinge connected to the second servo-motor;
a fastener servo-linear installation device including:
a third servo-motor and a fourth servo-motor;
a first fastener effector with the third servo-motor directing motion of the first fastener effector in opposed vertical directions; and
a second fastener effector with the fourth servo-motor directing motion of the second fastener effector in opposed vertical directions;
reading a hinge target set value;
introducing a body reference point to locate a hinge assembly;
identifying if a manual forced hinge set position indicates the hinge assembly may be automatically installed within predetermined offset values;
entering the offset values defining modified values for a first range of opposed vertical offset dimensions, a second range of opposed vertical offset dimensions and a range of rotation in real-time;
comparing the offset values to triggering threshold values;
if the offset values are greater than the triggering threshold values, the hinge assembly and the hinge servo-linear positioning device controlling a position of the hinge assembly are displaced by the offset values; and
aligning the hinge assembly to a vehicle body.

17. The method of claim 16, further including:
installing hinge bolts and applying a predetermined torque to the hinge bolts;
measuring an applied torque to the hinge bolts and comparing the applied torque to a target torque value; and
ending the program if the measured applied torque is greater than the target torque value.

18. The method of claim 16, further including:
installing hinge bolts and applying a predetermined torque to the hinge bolts;
measuring an applied torque to the hinge bolts and comparing the applied torque to a target torque;
reapplying the predetermined torque if the measured hinge bolt torque is not greater than the target torque;
remeasuring the applied torque to the hinge bolts and comparing the remeasured applied torque to the target torque; and
stopping if the remeasured applied torque is greater than the target torque.

* * * * *